US009413672B2

(12) United States Patent
Vangala et al.

(10) Patent No.: US 9,413,672 B2
(45) Date of Patent: Aug. 9, 2016

(54) FLOW CONTROL FOR NETWORK PACKETS FROM APPLICATIONS IN ELECTRONIC DEVICES

(75) Inventors: Sarma V. R. K. V. Vangala, Santa Clara, CA (US); Faraz Faheem, Santa Clara, CA (US); Vikram B. Yerrabommanahalli, Sunnyvale, CA (US); Swaminathan Balakrishnan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 123 days.

(21) Appl. No.: 13/489,606

(22) Filed: Jun. 6, 2012

(65) Prior Publication Data

US 2013/0329556 A1     Dec. 12, 2013

(51) Int. Cl.
| | |
|---|---|
| *H04L 12/801* | (2013.01) |
| *H04L 12/927* | (2013.01) |
| *H04L 12/863* | (2013.01) |
| *H04L 12/54* | (2013.01) |
| *H04W 28/10* | (2009.01) |
| *H04W 28/14* | (2009.01) |
| *H04W 28/22* | (2009.01) |
| *H04L 12/851* | (2013.01) |
| *H04L 12/911* | (2013.01) |
| *H04L 29/08* | (2006.01) |

(52) U.S. Cl.
CPC .............. *H04L 47/29* (2013.01); *H04L 47/805* (2013.01)

(58) Field of Classification Search
CPC . H04L 47/10; H04L 47/2729; H04L 47/6215; H04L 47/805; H04L 29/08072; H04L 29/0809
USPC ......... 370/230, 235, 238, 389, 391, 233, 234, 370/236, 328
See application file for complete search history.

(56) References Cited

U.S. PATENT DOCUMENTS

| | | | | |
|---|---|---|---|---|
| 6,880,017 | B1 * | 4/2005 | Marce | H04L 69/32 709/232 |
| 2005/0232153 | A1 | 10/2005 | Bishop et al. | |
| 2008/0117930 | A1 * | 5/2008 | Chakareski et al. | 370/465 |
| 2009/0116503 | A1 * | 5/2009 | Sebastian | H04L 47/10 370/412 |

(Continued)

OTHER PUBLICATIONS

International Search Report directed to related International Patent Application No. PCT/US2013/041559, mailed Apr. 11, 2013; 5 pages.

(Continued)

*Primary Examiner* — Un C Cho
*Assistant Examiner* — Peian Lou
(74) *Attorney, Agent, or Firm* — Sterne, Kessler, Goldstein & Fox P.L.L.C.

(57) ABSTRACT

The disclosed embodiments provide a system that processes network packets on an electronic device. During operation, the system obtains, on the electronic device, an outgoing rate of the network packets from a network interface queue on the electronic device to a network link. Next, upon detecting a transmission of the network packets from an application on the electronic device to the network interface queue, the system uses the electronic device to allocate a proportion of the outgoing rate to the application based on a number of applications transmitting network packets from the electronic device to the network link. Finally, the system uses the allocated proportion of the outgoing rate and the network interface queue to transmit network packets from the application to the network link.

25 Claims, 5 Drawing Sheets

(56) References Cited

U.S. PATENT DOCUMENTS

| | | | |
|---|---|---|---|
| 2012/0106342 A1* | 5/2012 | Sundararajan et al. | 370/235 |
| 2012/0213075 A1* | 8/2012 | Koie et al. | 370/235 |
| 2013/0003538 A1* | 1/2013 | Greenberg et al. | 370/230 |
| 2013/0136000 A1* | 5/2013 | Torres et al. | 370/235 |
| 2013/0208593 A1* | 8/2013 | Nandagopal | H04L 47/00 370/232 |

OTHER PUBLICATIONS

International Preliminary Report on Patentability for International Application No. PCT/US2013/041559, issued Dec. 9, 2014; 9 pages.

* cited by examiner

FLOW CONTROL FOR NETWORK PACKETS FROM APPLICATIONS IN ELECTRONIC DEVICES

BACKGROUND

1. Field

The disclosed embodiments relate to flow control in networks. More specifically, the disclosed embodiments relate to techniques for providing flow control for network packets from electronic devices to network links in the networks.

2. Related Art

Network links such as wireless access points, cell towers, and/or routers may be shared by a number of network-enabled electronic devices such as personal computers, laptop computers, mobile phones, portable media players, printers, and/or video game consoles. To manage network traffic to the electronic devices, the network links may reduce the flow of packets to the electronic devices, reorder the packets, and/or drop the packets. Senders of the packets may also adjust the rate of transmission of subsequent packets based on packet errors, losses, and/or delays, thus lifting congestion at the network links and facilitating sharing of the network bandwidth by the electronic devices.

On the other hand, the electronic devices may lack the ability to control the flow of network packets from applications on the electronic devices to the network links. For example, multiple applications on an electronic device may place outgoing packets into a best-effort network interface queue for subsequent transmission of the outgoing packets to a network link connected to the electronic device. An aggressive application may consume available bandwidth on the network link by continuously placing outgoing packets into the network interface queue at or above the outgoing rate at which the outgoing packets are transmitted from the network interface queue to the network link. In addition, other applications may not get a chance to fill the network interface queue until the rate at which the aggressive application places outgoing packets into the network interface queue drops below the outgoing rate. As a result, the aggressive application may starve the other applications, causing the other applications to experienced increased latency on the network and, in turn, reduced performance.

SUMMARY

The disclosed embodiments provide a system that processes network packets on an electronic device. During operation, the system obtains, on the electronic device, an outgoing rate of the network packets from a network interface queue on the electronic device to a network link. Next, upon detecting a transmission of the network packets from an application on the electronic device to the network interface queue, the system uses the electronic device to allocate a proportion of the outgoing rate to the application based on a number of applications transmitting network packets from the electronic device to the network link. Finally, the system uses the allocated proportion of the outgoing rate and the network interface queue to transmit network packets from the application to the network link.

In some embodiments, the system also obtains, for the application, an incoming rate of the network packets to the network interface queue, and modifies the allocated proportion of the outgoing rate based on the incoming rate and one or more incoming rates for other applications on the electronic device. For example, the system may increase the allocated proportion if the incoming rate is higher than the average incoming rate for the other applications and decrease the allocated proportion if the incoming rate is lower than the average incoming rate for the other applications.

In some embodiments, the system also modifies the allocated proportion of the outgoing rate based on a priority of the application. For example, the system may increase the allocated proportion if the application is associated with a higher priority than other applications using the network link and decrease the allocated proportion if the application is associated with a lower priority than the other applications.

In some embodiments, the system also determines one or more response times of the application to events associated with the network interface queue, and sets one or more properties of the network interface queue based on at least one of the one or more response times, the outgoing rate, and a delay tolerance of the application. The events may include a flow enable event and/or a flow disable event, and the one or more properties may include a low-water mark, a high-water mark, and/or a do-not-exceed limit.

In some embodiments, using the allocated proportion of the outgoing rate and the network interface queue to transmit network packets from the application to the network link includes accepting the network packets from the application into the network interface queue until the allocated proportion of the network interface queue between the low-water mark and the high-water mark is reached. For example, the flow enable event may be transmitted to the application to accept the network packets from the application to the network interface queue. The flow disable event may then be to the application to stop the transmission of network packets from the application to the network interface queue.

In some embodiments, the network link is a cellular network link.

In some embodiments, the electronic device is at least one of a mobile phone, a tablet computer, and a portable media player.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
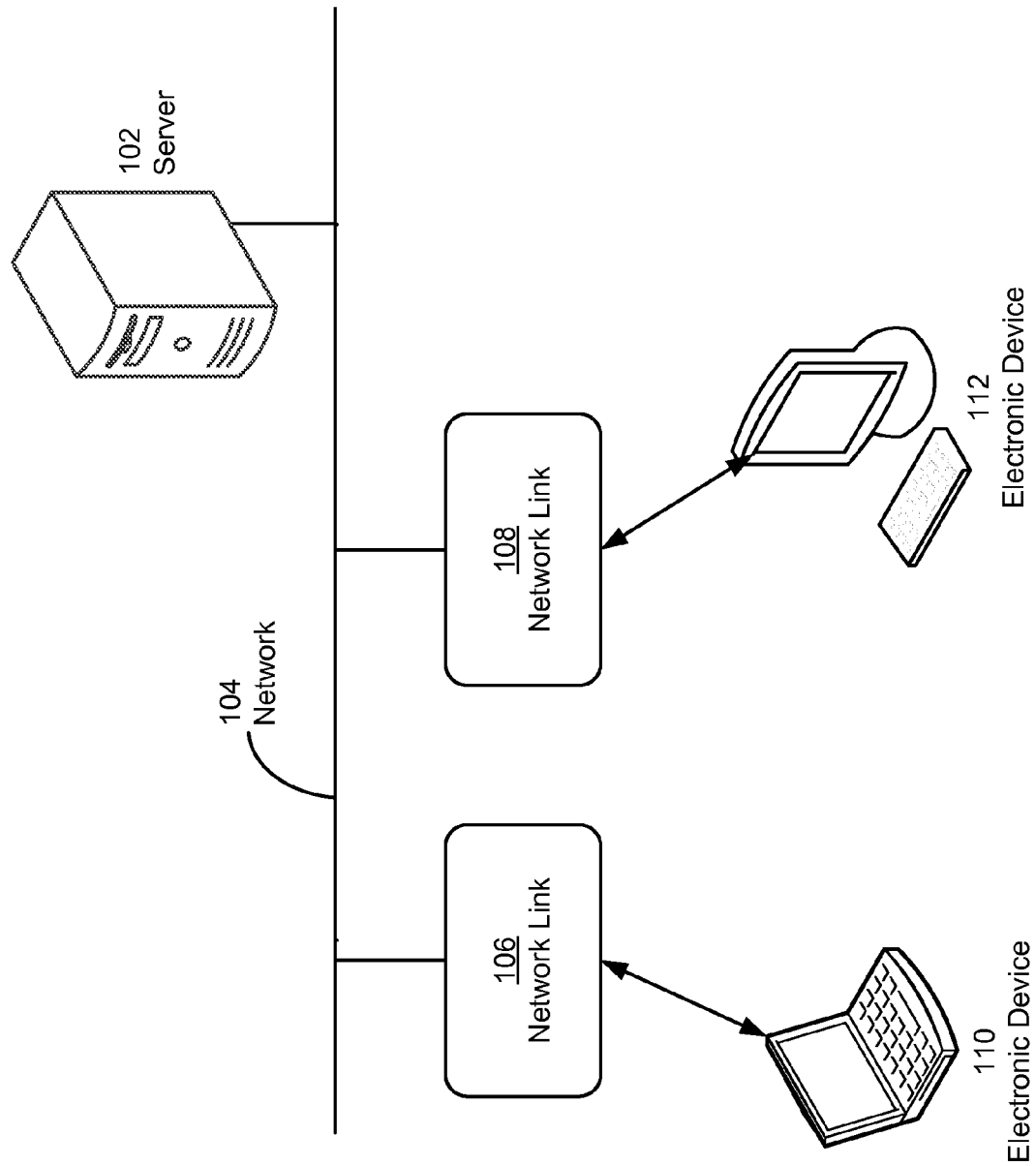
FIG. 1 shows a schematic of a system in accordance with the disclosed embodiments.

The disclosed embodiments provide a method and system for processing network packets on an electronic device. As shown in FIG. 1, a number of electronic devices 110-112 are connected to a network 104 through network links 106-108 provided by devices such as wireless access points, cell towers, and/or routers. Electronic devices 110-112 may correspond to personal computers, laptop computers, tablet computers, mobile phones, portable media players, and/or other network-enabled electronic devices. Network 104 may include a local area network (LAN), wide area network (WAN), personal area network (PAN), virtual private network, intranet, mobile phone network (e.g., a cellular network), WiFi network, Bluetooth network, universal serial bus (USB) network, Ethernet network, an ad hoc network formed between two or more devices, and/or other type of network that facilitates communication among electronic devices (e.g., electronic devices 110-112) connected to network 104.

In particular, electronic devices 110-112 may interact with one another and/or a server 102 on network 104 by sending and receiving data such as files, audio, video, and/or web content over network 104. For example, electronic device 110 may request data from electronic device 112 and server 102 by establishing Transmission Control Protocol (TCP) connections with electronic device 112 and server 102. Electronic device 112 and server 102 may provide the requested data by transmitting a sequence of packets containing the data over network 104 to electronic device 110. At the same time, electronic devices 110-112 and/or other electronic devices (not shown) may communicate with one another, server 102, and/or other servers (not shown) on network 104 by transmitting and receiving packets over network 104.

To prevent and/or mitigate congestion on network, network links 106-108 and/or other network links (not shown) on network 104 may implement network traffic control techniques that queue, reorder, delay, and/or drop packets to electronic devices 110-112 and/or the other electronic devices. Electronic devices 110-112, server 102, and/or the other servers or devices may also adjust the rate of transmission of subsequent packets based on packet errors, losses, and/or delays, thus facilitating sharing of available bandwidth and/or effective use of network 104 by the electronic devices. Components of network 104 may also support Quality of Service (QoS) that guarantees a certain level of performance (e.g., bandwidth, packet drop rate, delay, etc.) for QoS data flows along network 104.

Conversely, QoS may not be supported by electronic devices 110-112, server 102, network links 106-108, and/or other components (e.g., routers, switches, etc.) of network 104. As a result, applications on electronic devices 110-112 may experience varying levels of performance in transmitting packets to network links 106-108.

For example, applications on electronic device 112 may place outgoing packets into a best-effort network interface queue for subsequent transmission of the outgoing packets to network link 108. An aggressive application may consume available bandwidth on network link 108 by continuously placing outgoing packets into the network interface queue at or above the outgoing rate of packet transmission from the network interface queue to network link 108. Moreover, other applications may not get a chance to place outgoing packets into the network interface queue until the rate at which the aggressive application places outgoing packets into the network interface queue drops below the outgoing rate. The aggressive application may thus starve the other applications, causing the other applications to experienced increased latency on network 104 and, in turn, reduced performance. At the same time, fluctuations in the outgoing rate between electronic device 112 and network link 108 may further contribute to variations and/or unpredictability in the data rates and/or latencies experienced by the applications.

Figure 2:
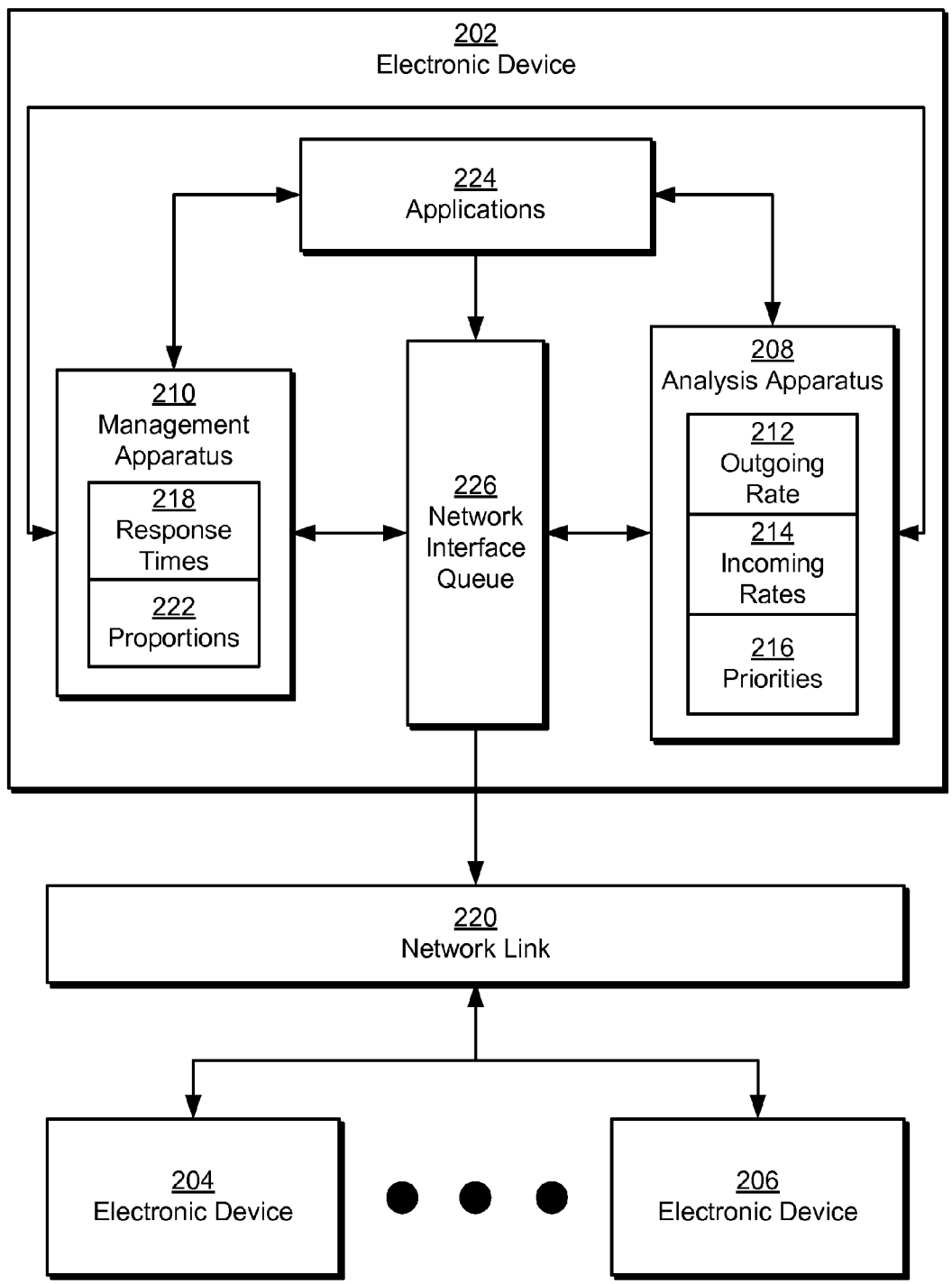
FIG. 2 shows a system for processing network packets on an electronic device in accordance with the disclosed embodiments.

In one or more embodiments, electronic devices 110-112 include functionality to provide flow control for outgoing packets from applications in electronic devices 110-112 in the absence of QoS support and/or processing on the applications and/or network 104. As shown in FIG. 2, a set of electronic devices 202-206 (e.g., personal computers, laptop computers, mobile phones, tablet computers, portable media players, servers, etc.) may be connected to one another through a network such as network 104 of FIG. 1. In particular, applications 224 on electronic device 202 may transmit data to electronic devices 204-206 by placing network packets destined for electronic devices 204-206 into a network interface queue 226. While the network packets are in network interface queue 226, the network packets may be processed by one or more layers of a network stack on electronic device 202. The network packets may then be transmitted over a network interface with a network link 220 on the network. For example, the network packets may be transmitted from a baseband processor on a mobile phone over an air interface to a nearby cellular tower.

As mentioned above, a lack of QoS support may cause applications 224 to experience significant fluctuations in data rates at which network packets from network interface queue 226 are transmitted to network link 220. To facilitate equitable use of network link 220 by applications 224, electronic device 202 may allocate proportions 222 of an outgoing rate 212 of network packets from network interface queue 226 to network link 220 to applications 224. As discussed in further detail below, the allocation may be based on the number of applications 224 transmitting packets to network link 220, a set of incoming rates 214 of network packets from applications 224 to network interface queue 226, and/or a set of priorities 216 for applications 224.

In particular, an analysis apparatus 208 on electronic device 202 may periodically obtain outgoing rate 212 by, for example, monitoring the transmission of network packets from network interface queue 226 to network link 220. If analysis apparatus 208 detects a transmission of network packets from an application (e.g., applications 224) to network interface queue 226, analysis apparatus 208 may allocate a proportion (e.g., proportions 222) of outgoing rate 212 to the application based on the number of applications 224 transmitting network packets to network link 220. For example, analysis apparatus 208 may split outgoing rate 212 evenly among applications 224 actively using network link 220. Analysis apparatus 208 may additionally update the allocated proportions 222 to applications 224 in response to changes in outgoing rate 212 and/or the number of applications 224 actively using network link 220.

Analysis apparatus 208 may also modify proportions 222 based on incoming rates 214 of network packets from applications 224 to network interface queue 226 and/or one or more priorities 216 of applications 224. For example, analysis apparatus 208 may allocate proportions 222 so that an application with a higher incoming rate receives a higher share of outgoing rates 212 than an application with a lower incoming rate. Similarly, analysis apparatus 208 may determine priorities 216 of applications 224 based on protocols used by applications 224, types of applications 224, and/or QoS information in network packets from applications 224. Analysis apparatus 208 may then allocate higher proportions of outgoing rate 212 to higher-priority applications and lower proportions of outgoing rate 212 to lower-priority applications.

Next, a management apparatus 210 on electronic device 202 may use the allocated proportion of outgoing rate 212 and network interface queue 226 to transmit network packets from the application to network link 220. In particular, management apparatus 210 may maintain an ordered list of applications 224 actively transmitting network packets to network link 220. Management apparatus 210 may accept network packets from the first application on the ordered list into network interface queue 226 until the allocated proportion of network interface queue 226 for the application is reached by the network packets. Management apparatus 210 may then proceed to the next application on the ordered list and accept network packets from the next application until the allocated proportion of network interface queue 226 for the next application is reached. Management apparatus 210 may continue to add network packets from applications 224 on the ordered list to network interface queue 226 until network packets from all applications 224 on the ordered list have "filled" network interface queue 226.

To accept the network packets from each application, management apparatus 210 may transmit a flow enable event to the application, and the application may begin transmitting network packets to network interface queue 226 upon receiving the flow enable event. To stop the flow of network packets from the application to network interface queue 226, management apparatus 210 may transmit a flow disable event to the application, and the application may stop transmitting network packets to network interface queue 226 upon receiving the flow disable event.

While applications 224 are adding network packets to network interface queue 226, the transmission of network packets from network interface queue 226 to network link 220 may remove network packets from network interface queue 226. If the removed network packets create sufficient free space in network interface queue 226 after management apparatus 210 has gone through the ordered list, management apparatus 210 may return to the beginning of the ordered list and fill the space previously occupied by the removed network packets with new network packets from applications 224 on the ordered list. In other words, management apparatus 208 may fill network interface queue 226 with network packets from applications 224 in a round-robin fashion, thus ensuring that network packets from all applications 224 are being placed into network interface queue 226 according to proportions 222.

In addition, management apparatus 210 may periodically calculate response times 218 of applications 224 to the flow enable and/or flow disable events and set one or more properties of network interface queue 226 based on response times 218, outgoing rate 212, and/or a delay tolerance of applications 224. The properties may specify the size and/or boundaries of network interface queue 226. For example, the properties may include a low-water mark, a high-water mark, and/or a do-not-exceed limit for network interface queue 226. By setting the properties according to the behavior and/or constraints of applications 224 and/or network link 220, management apparatus 210 may help avoid network interface queue 226 from becoming full or empty, and transmission of network packets from applications 224 to network link 220 can meet the timing requirements of the least delay-tolerant application using network link 220. Properties of network interface queues are discussed in further detail below with respect to FIG. 3.

Those skilled in the art will appreciate that the system of FIG. 2 may be implemented in a variety of ways. First, analysis apparatus 208 and management apparatus 210 may be provided by the same software and/or hardware component, or analysis apparatus 208 and management apparatus 210 may execute independently from one another. For example, analysis apparatus 208 and filtering apparatus 210 may be implemented using different combinations of an application processor, a baseband processor, a multi-core processor, a single-core processor, an operating system kernel, a standalone application, and/or a driver on electronic device 202.

Second, analysis apparatus 208 and management apparatus 210 may allocate proportions 222 of outgoing rate 212 (e.g., network bandwidth) to applications 224 based on a number of criteria. As mentioned above, proportions 222 may be allocated based on the number of applications 224 actively using network link 220, priorities 216 of applications 224, and/or incoming rates 214 of applications 224. In addition, analysis apparatus 208 and/or management apparatus 210 may use various techniques to accommodate the use of network link 220 by new applications and/or discontinue use of network link 220 by applications with allocated bandwidth. For example, analysis apparatus 208 and/or management apparatus 210 may initially allocate a small proportion of outgoing rate 212 to an application that recently started using network link 220 and modify the allocated proportion once the incoming rate and/or response time(s) of the application are determined. Alternatively, analysis apparatus 208 and/or management apparatus 210 may immediately allocate the proportion of outgoing rate 212 to the application based on the application's priority and/or the number of applications 224 transmitting network packets to network interface queue 226.

Finally, analysis apparatus 208 and management apparatus 210 may provide flow control for network packets from applications 224 in lieu of and/or in conjunction with QoS processing of network packets from electronic device 202 to network link 220. For example, analysis apparatus 208 and management apparatus 210 may use network interface queue 226 to process and/or transmit network packets that lack QoS information and a separate network interface queue to process and/or transmit network packets that include QoS information. On the other hand, if QoS is not supported by network link 220 and/or other components of the network, analysis apparatus 208 and management apparatus 210 may use network interface queue 226 to process and/or transmit network packets from all applications on electronic device 202, regardless of the presence of QoS information in the packets. To facilitate the transmission of network packets that contain QoS information, analysis apparatus 208 and management apparatus 210 may prioritize the applications from which the network packets were obtained over applications that do not include QoS information in outgoing network packets.

Figure 3:
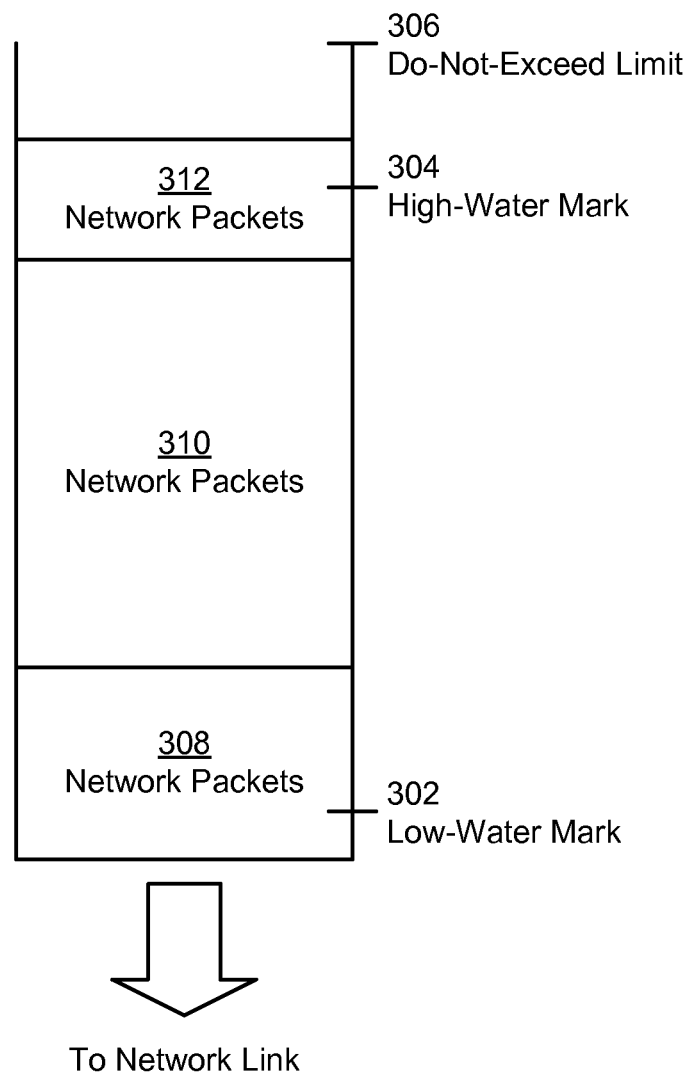
FIG. 3 shows an exemplary network interface queue in accordance with the disclosed embodiments.

FIG. 3 shows an exemplary network interface queue in accordance with the disclosed embodiments. The network interface queue is filled with network packets 308-312 from three different applications on an electronic device. In addition, the network interface queue is associated with a set of properties, including a low-water mark 302, a high-water mark 304, and a do-not-exceed limit 306.

As mentioned above, low-water mark 302, high-water mark 304, and do-not-exceed limit 306 may specify the boundaries and/or size of the network interface queue. For example, low-water mark 302 and high-water mark 304 may define the effective size of the network interface queue, while do-not-exceed limit 306 may represent the maximum size of the network interface queue, or a point past which network packets are discarded instead of placed into the network interface queue.

The network interface queue's properties may be set to help avoid the network interface queue from becoming completely full or completely empty during use of the network interface queue, and that the amount of time required to fill the network interface queue with network packets 308-312 is typically less than the time requirement of the least delay-tolerant application. As shown in FIG. 3, low-water mark 302 may be slightly above the bottom of the network interface queue (e.g., a first-in-first-out (FIFO) queue), where network packets drain out to a network link, while high-water mark 304 may be slightly below the top (e.g., do-not-exceed limit 306) of the network interface queue, where recently added network packets wait to reach the bottom.

The offsetting of low-water mark 302 and high-water mark 304 from the actual bottom and top of the network interface queue, respectively, may account for response times of the applications to events associated with the network interface queue. For example, low-water mark 302 may be calculated based on the average response time of the applications to a flow enable event that triggers the placement of network packets from the applications into the network interface queue multiplied by the outgoing rate of the network packets from the bottom of the network interface queue to the network link. Similarly, high-water mark 304 may be calculated based on the abort timer (e.g., delay tolerance) of the least delay-tolerant application using the network link multiplied by the outgoing rate of the network interface queue. Finally, do-not-exceed limit 306 may be set so that the space between high-water mark 304 and do-not-exceed limit 306 accommodates the response times of all of the applications to a flow disable event that stops the flow of network packets from the applications into the network interface queue.

The properties may then be used to regulate the transmission of network packets 308-312 from the applications to the network interface queue. First, the emptying of the network interface queue to low-water mark 302 may trigger the transmission of a flow enable event to a first application so that the first application may begin filling the network interface queue with network packets 308. Draining of network packets between low-water mark 302 and the bottom of the network interface queue may also occur during the delay between the transmission of the flow enable event and the receipt of network packets 308 in the network interface queue (e.g., the response time of the first application to the flow enable event).

Next, the first application may transmit network packets 308 to the network interface queue until a first allocated proportion of the network interface queue between low-water mark 302 and high-water mark 304 for the first application is reached. A flow disable event may be transmitted to the first application to stop transmission of network packets 308, and a flow enable event may be transmitted to a second application to initiate the transmission of network packets 310 to the network interface queue. The flow disable and flow enable events may also be timed to minimize the delay between the end of transmission of network packets 308 and the beginning of transmission of network packets 310.

Once a second allocated proportion of the network interface queue between low-water mark 302 and high-water mark 304 for the second application has been filled with network packets 310, a flow disable event may be transmitted to the second application to stop the transmission of network packets 310 to the network interface queue. A flow enable event may then be transmitted to a third application to initiate the transmission of network packets 312 from the third application to the network interface queue. Finally, once network packets 312 reach high-water mark 304 and/or a third allocated proportion of the network interface queue between low-water mark 302 and high-water mark 304, a flow disable event may be transmitted to the third application. Transmission of network packets 312 to the network interface queue may then cease after the response time of the third application to the flow disable event has passed.

In addition, the portion of the network interface queue between low-water mark 302 and high-water mark 304 may be filled with network packets 308-312 in less time than the shortest abort timer from the applications, thus allowing network packets 308-312 to meet the delay tolerances of all three applications. Moreover, the allocating of different proportions of the network interface queue and/or outgoing rate to the applications may enable access to the network link by all applications while providing applications with higher incoming rates and/or priorities (e.g., the second application) with greater access to the network link than applications with lower incoming rates and/or priorities (e.g., the third application). Consequently, the use of allocated proportions, low-water mark 302, high-water mark 304, and/or do-not-exceed limit 306 may guarantee a certain level of performance to each application using the network link, even if the application and/or network link do not support QoS.

While the network interface queue is filled with network packets 308-312, network packets 308-312 may also be transmitted from the bottom of the network interface queue to the network link. As a result, some of network packets 308 and/or network packets 310 may be removed from the network interface queue by the time network packets 312 are added to the network interface queue. The removal of network packets from the bottom of the network interface queue may further trigger the continual addition of network packets in a round-robin fashion from the first, second, and third applications to the network interface queue above network packets 312. Such ordered and/or proportional transmission of network packets from applications actively using the network link may continue until the network link is no longer used by the applications and/or the electronic device is disconnected from the network link.

Figure 4:
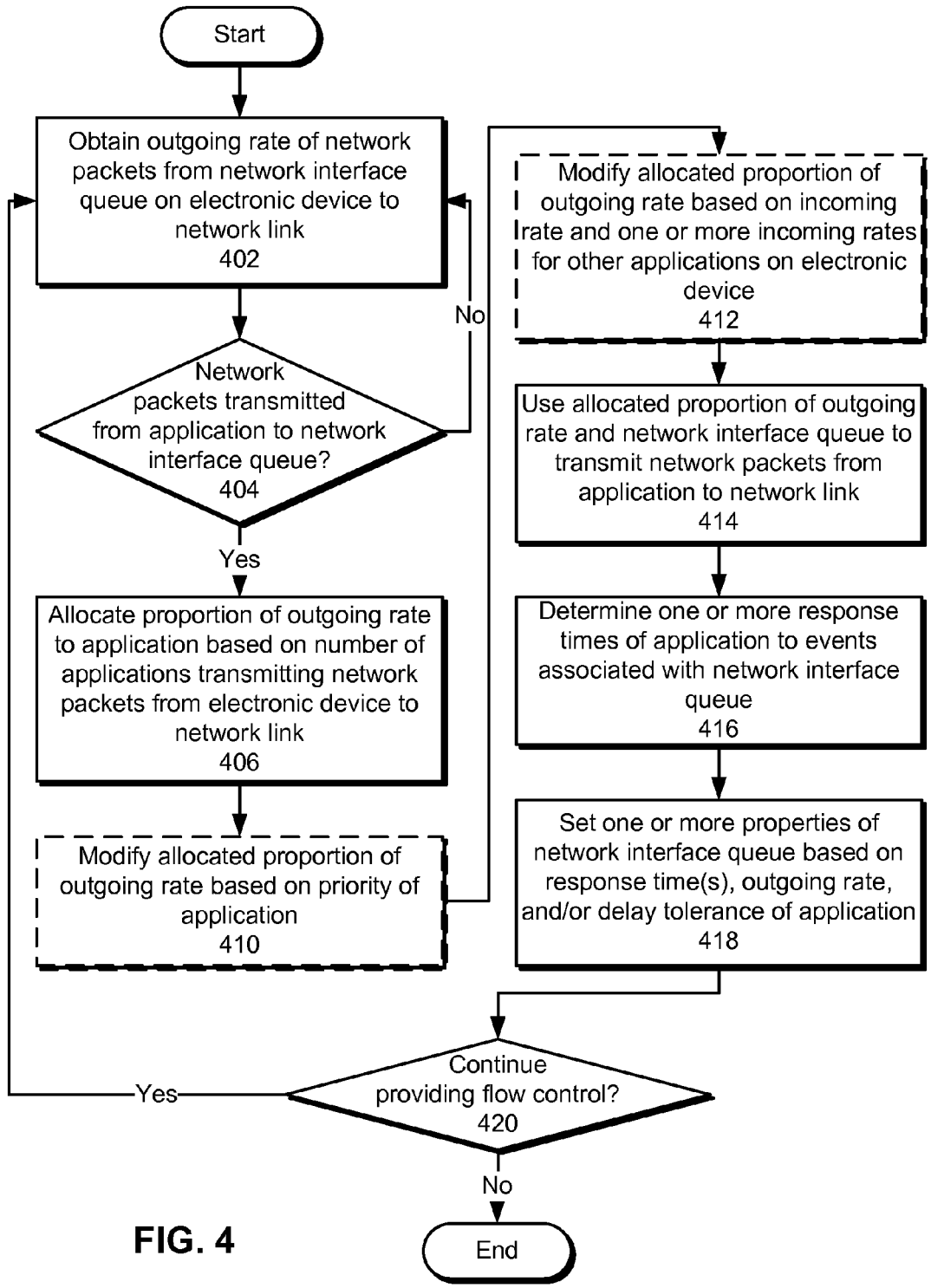
FIG. 4 shows a flowchart illustrating the process of processing network packets on an electronic device in accordance with the disclosed embodiments.

FIG. 4 shows a flowchart illustrating the process of processing network packets on an electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, an outgoing rate of the network packets from a network interface queue on the electronic device to a network link is obtained (operation 402). The outgoing rate may fluctuate based on the network interface between the electronic device and the network link. For example, the outgoing rate from the electronic device over an interface with a cellular network link (e.g., a cellular tower) may vary based on the number of electronic devices connected to the cellular network link, the level of interference from other electronic devices, and/or the presence of obstacles between the electronic device and the cellular tower.

Before the network packets are transmitted to the network link, the network packets may be transmitted from an application on the electronic device to the network interface queue (operation 404). If transmission of network packets from the application to the network interface queue is detected, a proportion of the outgoing rate is allocated to the application based on the number of applications transmitting network packets from the electronic device to the network link (operation 406). For example, the proportion of the outgoing rate allocated to the application may be equal to the outgoing rate divided by the number of applications actively transmitting network packets from the electronic device to the network link.

The application may also be associated with a priority. For example, the priority of the application may be based on network protocols used by the application, the application's type, and/or QoS data in the application's network packets. If the application is associated with a priority, the allocated proportion of the outgoing rate is modified based on the priority (operation 408). If the application is not associated with a priority, the allocated proportion of the outgoing rate is not modified based on priority.

Likewise, an incoming rate of network packets from the application to the network interface queue may be available. If the incoming rate is available, the allocated proportion of the outgoing rate is modified based on the incoming rate and one or more incoming rates for other applications on the electronic device (operation 412). For example, the allocated proportion may be increased if the application has a higher incoming rate than the average incoming rates of the other applications and decreased if the application has a lower incoming rate than the average incoming rates of the other applications. If the incoming rate is not available, the allocated proportion of the outgoing rate is not modified based on the incoming rate.

The allocated proportion of the outgoing rate and the network interface queue are then used to transmit network packets from the application to the network link (operation 414). For example, transmission of network packets from the application into the network interface queue may be initiated by transmitting a flow enable event to the application and stopped by transmitting a flow disable event to the application. The flow enable and flow disable events may additionally be transmitted so that the network packets from the application are accepted into the network interface queue until the allocated proportion of the network interface queue is reached. After the application has stopped transmitting network packets into the network queue, the flow enable and flow disable events may be used to transmit network packets from another application into the network interface queue.

One or more response times of the application to events associated with the network interface queue are also determined (operation 416). For example, the application's response times to the flow enable and flow disable events may be calculated. The response time(s), outgoing rate, and/or delay tolerance of the application may then be used to set one or more properties of the network interface queue (operation 418). The properties may include a low-water mark, a high-water mark, and/or a do-not-exceed limit that specify the size and/or boundaries of the network interface queue. Such management of the properties according to the behavior and/or constraints of the application and/or network link may ensure that the network interface queue is never completely full or completely empty while the network link is being used and transmission of network packets from applications to the network interface queue meet the timing requirements of the least delay-tolerant application.

Flow control may continue to be provided (operation 420) during use of the network interface queue and/or network link by applications on the electronic device. If flow control is to be provided, the outgoing rate of the network interface queue is periodically obtained (operation 402), and use of the network link by each application is managed by allocating a proportion of the outgoing rate to the application and using the allocated proportion to transmit network packets from the application to the network link (operations 406-414). Response times of the applications to events associated with the network interface queue are also obtained (operation 416), and one or more properties of the network interface queue are set based on the response time(s), outgoing rate, and/or delay tolerance of the applications (operation 418). Such flow control may ensure proportionate and timely access to the outgoing rate by all applications using the network link until the network interface queue and/or network link are no longer used by the applications to transmit network packets.

Figure 5:
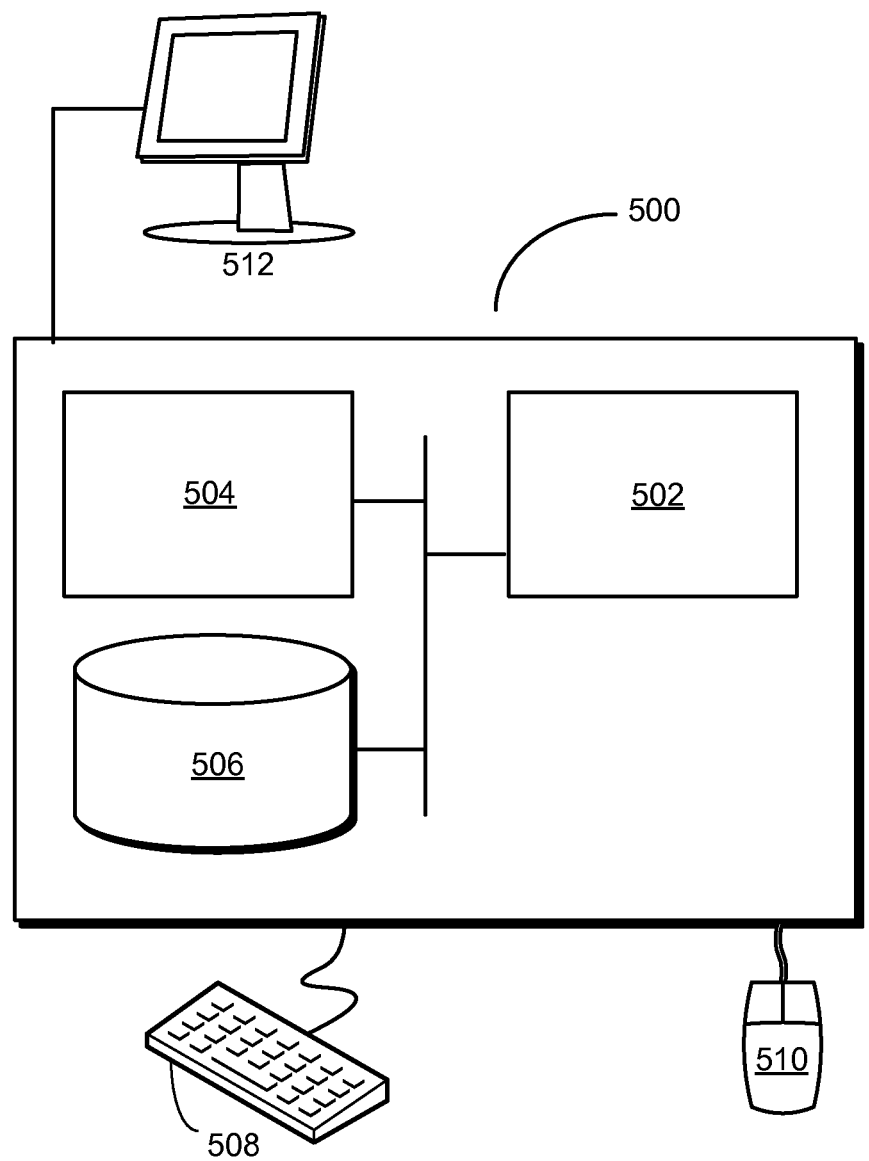
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing network packets on an electronic device. The system may include an analysis apparatus that obtains an outgoing rate of the network packets from a network interface queue on the electronic device to a network link. Upon detecting a transmission of network packets from an application on the electronic device to the network interface queue, the analysis apparatus may allocate a proportion of the outgoing rate to the application based on a number of applications transmitting network packets from the electronic device to the network link. The analysis apparatus may also modify the allocated proportion of the outgoing rate based on a priority of the application, an incoming rate of the network packets to the network interface queue, and/or one or more incoming rates for other applications on the electronic device. The system may also include a management apparatus that uses the allocated proportion of the outgoing rate and the network interface queue to transmit network packets from the application to the network link.

In addition, one or more components of computer system 500 may be remotely located and connected to the other components over a network. Portions of the present embodiments (e.g., analysis apparatus, management apparatus, etc.) may also be located on different nodes of a distributed system that implements the embodiments. For example, the present embodiments may be implemented using a remote flow control system that allocates network bandwidth to applications on a set of remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for processing network packets on an electronic device, comprising:
   obtaining, on the electronic device, an outgoing rate of network packets from a network interface queue on the electronic device to a network link; and
   upon detecting a transmission of the network packets from an application on the electronic device to the network interface queue, using the electronic device to:
      allocate a proportion of the outgoing rate to the application using a number of applications transmitting the network packets from the electronic device to the network link; and
      use the allocated proportion of the outgoing rate to control the number of packets that the network interface queue accepts from the application by sending corresponding signals to the application to cause the application to commence or stop a flow of network packets to be stored in the network interface queue before being transmitted to the network link.

2. The computer-implemented method of claim 1, further comprising:
   obtaining, for the application, an incoming rate of the network packets to the network interface queue; and
   using the incoming rate to modify the allocated proportion of the outgoing rate.

3. The computer-implemented method of claim 1, further comprising:
   using a priority of the application to modify the allocated proportion of the outgoing rate.

4. The computer-implemented method of claim 1, further comprising:
   determining one or more response times of the application to events associated with the network interface queue; and
   setting one or more properties of the network interface queue using at least one of the one or more response times, the outgoing rate, and a delay tolerance of the application.

5. The computer-implemented method of claim 4, wherein the events comprise at least one of:
   a flow enable event; and
   a flow disable event.

6. The computer-implemented method of claim 4, wherein the one or more properties comprise at least one of:
   a low-water mark;
   a high-water mark; and
   a do-not-exceed limit.

7. The computer-implemented method of claim 6, further comprising:
   accepting the network packets from the application into the network interface queue until the allocated proportion of the network interface queue between the low-water mark and the high-water mark is reached.

8. The computer-implemented method of claim 1, wherein the network link is a cellular network link.

9. The computer-implemented method of claim 1, wherein sending the corresponding signals to the application to cause the application to commence or stop a flow of network packets comprises:
   sending, to the application, a flow enable event causing the application to commence transmitting network packets to the network interface queue upon receiving the flow enable event or a flow disable event causing the application to stop transmitting network packets to the network interface queue upon receiving the flow disable event.

10. The computer-implemented method of claim 1, further comprising:
    executing, on the electronic device, the application that transmits the network packets from the electronic device to the network link.

11. A system for processing network packets, comprising:
    an electronic device comprising a processor and a memory, wherein the electronic device:
       obtains an outgoing rate of network packets from a network interface queue on the electronic device to a network link; and
       allocates, upon detecting a transmission of the network packets from an application on the electronic device to the network interface queue, a proportion of the outgoing rate to the application using a number of applications transmitting the network packets from the electronic device to the network link; and
       uses the allocated proportion of the outgoing rate to control the number of packets the network interface queue accepts from the application by signaling the application to cause the application to commence or stop a flow of network packets to be stored in the network interface queue before being transmitted to the network link.

12. The system of claim 11, wherein the electronic device further:
    obtains, for the application, an incoming rate of the network packets to the network interface queue; and
    modifies the allocated proportion of the outgoing rate using the incoming rate.

13. The system of claim 11, wherein the electronic device further:
    modifies the allocated proportion of the outgoing rate using a priority of the application.

14. The system of claim 11, wherein the electronic device further:
    determines one or more response times of the application to events associated with the network interface queue; and
    sets one or more properties of the network interface queue based on at least one of the one or more response times, the outgoing rate, and a delay tolerance of the application.

15. The system of claim 14, wherein the events comprise at least one of:
   a flow enable event; and
   a flow disable event.

16. The system of claim 14, wherein the one or more properties comprise at least one of:
   a low-water mark;
   a high-water mark; and
   a do-not-exceed limit.

17. The system of claim 16, further comprising:
   accepting the network packets from the application into the network interface queue until the allocated proportion of the network interface queue between the low-water mark and the high-water mark is reached.

18. The system of claim 11, wherein the electronic device is at least one of a mobile phone, a tablet computer, and a portable media player.

19. A non-transitory computer-readable storage medium storing instructions that when executed by a computer cause the computer to perform a method for processing network packets on an electronic device, the method comprising:
   obtaining, on the electronic device, an outgoing rate of network packets from a network interface queue on the electronic device to a network link; and
   upon detecting a transmission of the network packets from an application on the electronic device to the network interface queue, using the electronic device to:
   allocate a proportion of the outgoing rate to the application using a number of applications transmitting the network packets from the electronic device to the network link; and
   use the allocated proportion of the outgoing rate to control the number of packets that the network interface queue will accept from the application by sending corresponding signals to the application to cause the application to commence or stop a flow of network packets to be stored in the network interface queue before being transmitted to the network link.

20. The non-transitory computer-readable storage medium of claim 19, the method further comprising:
   obtaining, for the application, an incoming rate of the network packets to the network interface queue; and
   modifying the allocated proportion of the outgoing rate using the incoming rate and one or more incoming rates for other applications on the electronic device.

21. The non-transitory computer-readable storage medium of claim 19, the method further comprising:
   modifying the allocated proportion of the outgoing rate using a priority of the application.

22. The non-transitory computer-readable storage medium of claim 19, the method further comprising:
   determining one or more response times of the application to events associated with the network interface queue; and
   setting one or more properties of the network interface queue using at least one of the one or more response times, the outgoing rate, and a delay tolerance of the application.

23. The non-transitory computer-readable storage medium of claim 22, wherein the events comprise at least one of:
   a flow enable event; and
   a flow disable event.

24. The non-transitory computer-readable storage medium of claim 22, wherein the one or more properties comprise at least one of:
   a low-water mark;
   a high-water mark; and
   a do-not-exceed limit.

25. The non-transitory computer-readable storage medium of claim 24, wherein using the allocated proportion of the outgoing rate and the network interface queue to transmit the network packets from the application to the network link comprises:
   accepting the network packets from the application into the network interface queue until the allocated proportion of the network interface queue between the low-water mark and the high-water mark is reached.

* * * * *